UNITED STATES PATENT OFFICE.

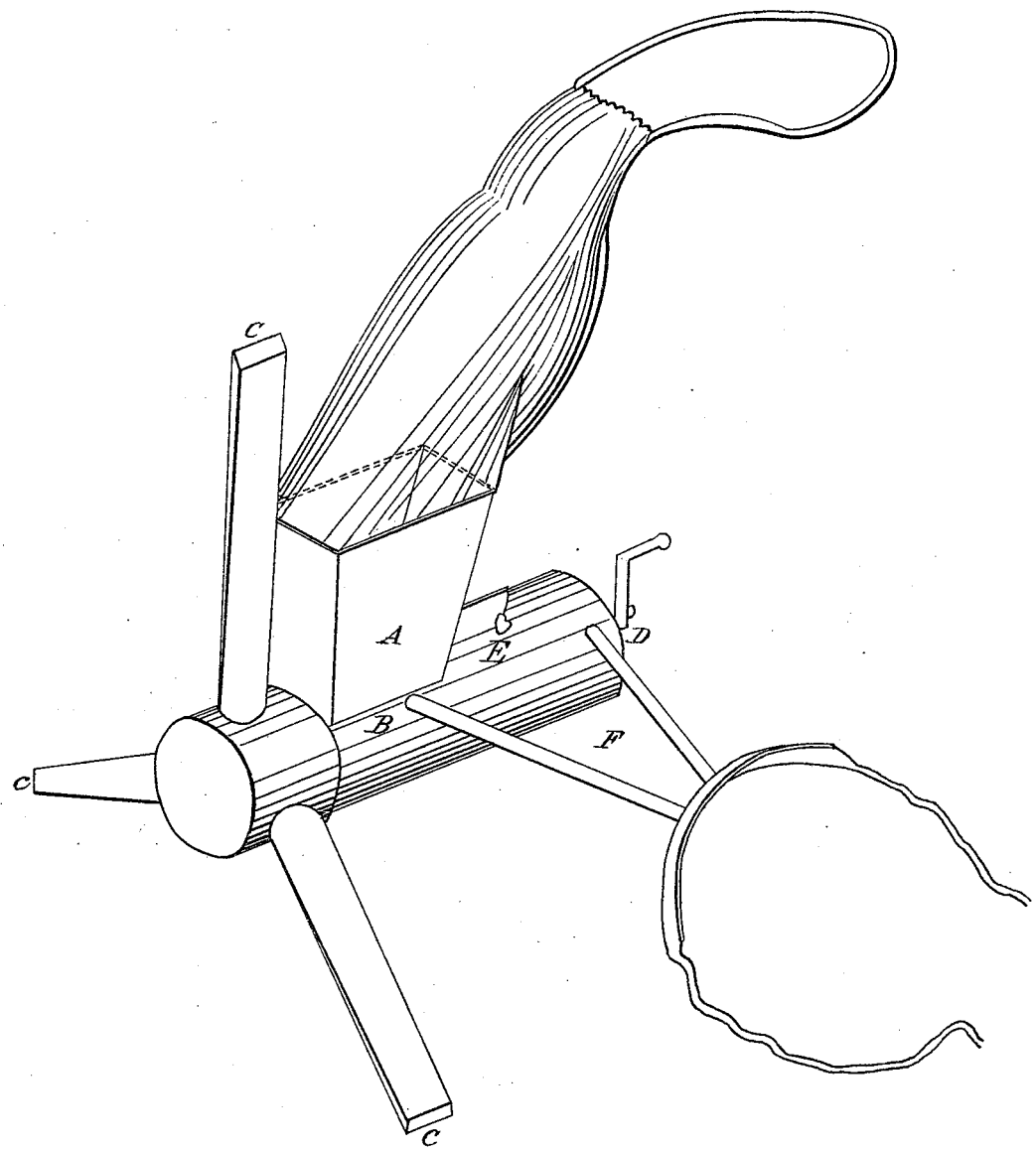

AARON RING, OF WESTBROOK, MAINE.

IMPROVEMENT IN SEEDING-MACHINES.

Specification forming part of Letters Patent No. 19,514, dated March 2, 1858.

*To all whom it may concern:*

Be it known that I, AARON RING, of Westbrook, in the county of Cumberland, in the State of Maine, have invented a new and Improved Machine for Sowing Seed Broadcast; and I do hereby declare that the following is a full and exact description thereof, reference being had to the accompanying drawings, and to the letters of reference marked thereon.

I construct my machine mostly of tin-plate. It may be made of other materials, such as iron, zinc, and copper or brass. I make a tin tube three inches in diameter and about seven inches long. About one-half inch from one end I punch a hole one and one-half inch in diameter, over which will be soldered a small hopper, as at A. Upon the other end a close-fitting cover is soldered, in the center of which a small hole is made to receive the main shaft, and around this hole a composition box is soldered for the shaft to run in. The shaft may be about ten inches long and about one-half inch in diameter. Another piece of tin of an oval shape, with shaft-hole and box in the center, I solder near the hopper end of seven-inch tube, inside, with one edge near the back of hopper-hole and the lower edge near to end of tube, as indicated by the dotted line at B. I then make another tube about two inches long, large enough in diameter to revolve around the seven-inch tube without much friction, but not large enough to allow the grain to get in between them. On one end of this short tube I solder a stout end, and around the periphery of this short tube, at equal distances, punch three holes, or more or less, about one inch in diameter; over these holes solder tubes one inch in diameter and about ten inches long. The outer ends of these tubes are made the shape of an oblong square, as at *c c c*, which gives the seeds an inclination to spread or scatter as they leave the tubes. On the inside, in the center of the short tube, on which the three ten-inch tubes are soldered, I solder one end of the main shaft at right angles with the ten-inch tubes, then put the other end of the shaft into the composition box beneath the hopper, run it through the other box in the other end of the seven-inch tube, and attach to it a crank, as at D. The hopper may be square or round, and be soldered on one-half inch from the end of the seven-inch tube, to allow the short tube, which is attached to the shaft, to come on over the seven-inch tube up as near the hopper as will answer without much friction. The hopper must not stand out at the top enough to interfere with the distributing-tubes in their revolutions. A slide is fitted over the hole in the seven-inch tube in the bottom of the hopper, which can be moved back to allow the seed to run into the distributing-head, and thence into the tubes; or it may be closed partly or wholly, at the will of the operator. The handle of this slide is at E. Around and fastened to the top of the hopper is a cotton bag, which may hold about one-half bushel of grain, with a strap at the top to put round the operator's neck, which will prevent the seed from spilling and help support the weight. A slight frame is attached to the seven-inch tube, as at F, to keep the machine off from the body. To this frame are straps to tie round the operator, which keep the machine steady while sowing.

To operate this machine, put the strap at the top of the bag around your neck, with the machine near the right side, with the crank near the hip, tie the strings around your body, then fill the bag hopper with seed. Take the crank in the right hand and turn, and with the left hand move back the slide in the bottom of the hopper, which will allow the seed to run freely into the revolving head. Thence it will fly out the distributing-tubes, spreading as it falls, sowing very even and perfectly from twenty to thirty feet wide, according to the weight of seed sown. When you have sown as far as you wish, shut the slide with the left hand, and the seed is cut off at once. The operator can regulate the quantity of seed per acre by walking fast or slow.

These machines may be made larger or smaller than the dimensions here given.

I do not claim sowing seed by centrifugal force, for that has been done before. Neither do I claim the distributing-tubes in and of themselves alone, for they have been used in sowing seed broadcast. Neither do I claim the bag-hopper in and of itself. Neither do I claim the crank in and of itself alone; neither the shaft separate and alone; nor the slide at the bottom of the hopper. Neither do I claim the revolving head alone; but What I do claim, and desire to secure by Letters Patent, is—

The combination of these, substantially as and for the purpose set forth.

AARON RING.

Witnesses:
F. C. RING,
F. A. RING.